United States Patent [19]

Brenholt

[11] Patent Number: 4,869,012
[45] Date of Patent: Sep. 26, 1989

[54] FISHING LURE

[75] Inventor: David L. Brenholt, Menomonie, Wis.

[73] Assignee: Translab, Inc., Menomonie, Wis.

[21] Appl. No.: 288,768

[22] Filed: Dec. 22, 1988

[51] Int. Cl.⁴ ............................................. A01K 83/00
[52] U.S. Cl. ....................................... 43/42.1; 43/43.2
[58] Field of Search .................... 43/42.1, 42.09, 43.2, 43/43.4

[56] References Cited

U.S. PATENT DOCUMENTS

| | | | |
|---|---|---|---|
| 2,590,461 | 3/1952 | Rasch | 43/42.1 |
| 2,618,095 | 11/1952 | Igo | 43/43.4 |
| 2,691,841 | 10/1954 | Daniel | 43/42.1 |
| 2,987,844 | 6/1961 | Hill | 43/42.1 |
| 4,433,502 | 2/1984 | Steeve | 43/43.2 |
| 4,433,503 | 2/1984 | Schleif | 43/42.1 |
| 4,614,054 | 9/1986 | Forenyessy | 43/43.2 |

FOREIGN PATENT DOCUMENTS 696564 10/1964 Canada .................... 43/42.1

Primary Examiner—M. Jordan
Attorney, Agent, or Firm—Foley & Lardner

[57] ABSTRACT

A fishing lure for a treble type fishing hook formed from an integral resilient elongate member having a body portion, a number of split fins formed on the body portion and a tail portion including a number of legs corresponding to the number of fins on the body portion, the body portion including an axially extending opening to accommodate the shank of the fish hook with the hooks of the fish hook aligned in and protected by the fins.

8 Claims, 1 Drawing Sheet

FISHING LURE

BACKGROUND OF THE INVENTION

1. Field of the Invention

This invention relates to fishing lures and more particularly to a fishing lure formed from an integral resilient elongate member which can be mounted on a treble fish hook to resemble a "squid" and provide weedless action.

2. Description of the Prior Art

Fishing lures are available in all sizes and shapes. Since the conception of the hook and line, efforts have been made to simulate the appearance, sound, vibration, and smell of the common and often uncommon types of food that different types of fish are attracted to. With the introduction of the soft plastic materials, lures have been created to resemble worms, water dogs, centipedes, frogs, shrimp and the like. Each such lure being used for the various type of fish.

SUMMARY OF THE INVENTION

The present invention relates to a lure which combines various of the features which have been incorporated into lures in a configuration that in some respects resembles a "squid".

One of the principal features of the invention is the provision of a lure which can be readily attached to a treble type fish hook.

A further feature of the invention is the provision on a lure having split type fins which enclose the hooks of the treble type fish hook to make the lure weedless.

A further feature of the invention is the provision of tentacles or tails which are free to move in a manner resembling the motion of a living creature which is attractive to fish.

Other principal features and advantages of the invention will become apparent to those skilled in the art upon review of the following detailed description, claims and drawings.

DETAILED DESCRIPTION OF THE DRAWINGS

DETAILED DESCRIPTION OF A PREFERRED EMBODIMENT

Figure 1:
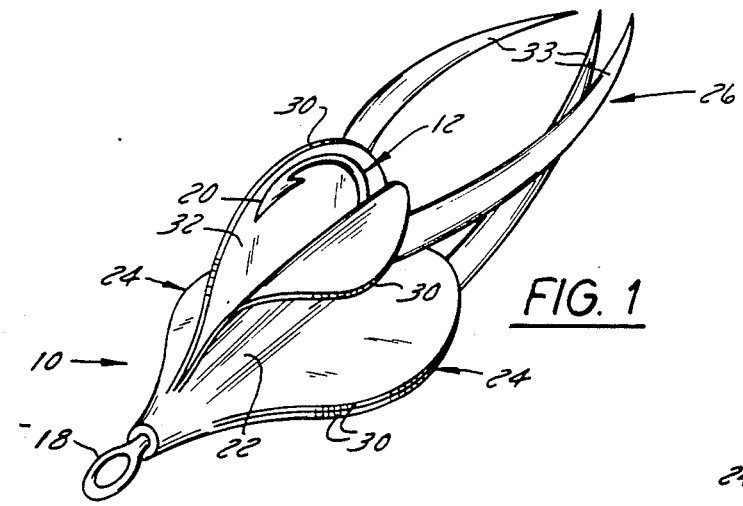
FIG. 1 is a perspective view of the lure shown mounted on a treble type fish hook.
Figure 2:
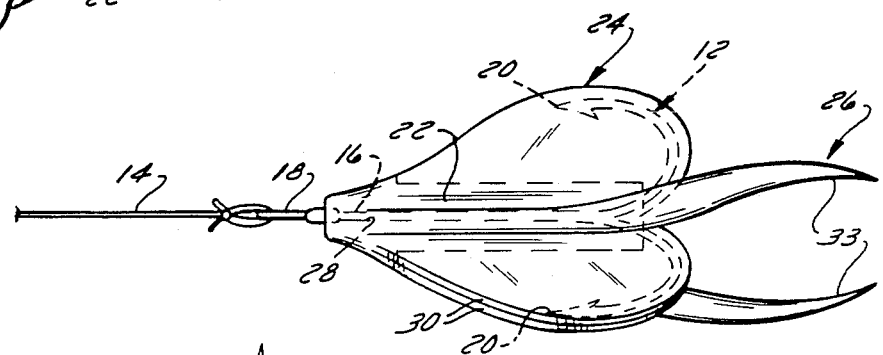
FIG. 2 is a side elevation view of the lure showing the location of the hooks in the fins.
Figure 3:
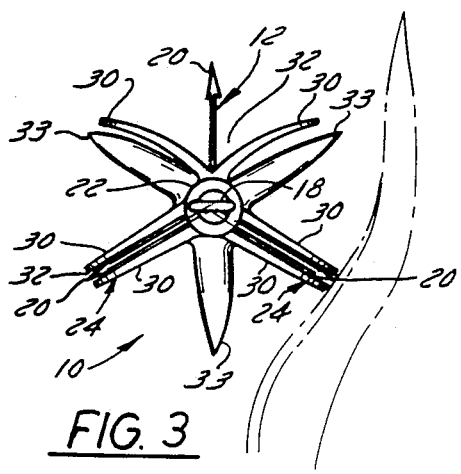
FIG. 3 is a front view of the lure showing the lips of one of the fins folded outwardly to expore the hooks.
Figure 4:
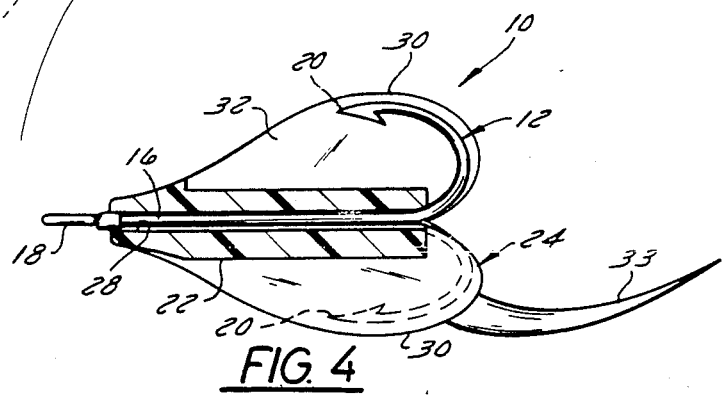
FIG. 4 is a cross-sectional view of the lure.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood, that the phraseology and terminology employed herein is for the purpose of description and should not be regarded as limiting.

The artificial lure 10, according to the present invention, is designed to accomodate a treble type fish hook 12 which is attached to a fishing line 14. The treble type fish hook 12 is of a conventional construction having a shank 16 with an eye 18 at one end and three hooks 20 at the other end. The hook 12 is removable from the lure 10 and can be interchanged with lures of different colors depending on the time of day.

The lure 10 is molded from a soft material such as a plastisol as an integral resilient elongate member which includes a body portion 22, a number of fins 24, and a tail portion 26. The body portion 22 includes a longitudinally extending opening 28 in which the shank of the treble type fish hook 12 is housed.

The fins 24 are formed around the outside of the body portion 22 with each fin positioned to accomodate one of the hooks 20 on the fish hook 12. As seen in the drawing, each of the fins is formed by a pair of lips 30 which form a slot 32 along the body portion 22. Each of the lips has a accurate outer contour that matches the curve of the hooks 20 on the treble fish hook 12. The lips have sufficient rigidity to guide the lure through weed beds without snagging the hooks 20 but are sufficiently resilient to bear the hooks 20 when a fish strikes the bait.

The tail portion 26 is formed by a number of legs or tentacles 33. Each of the legs 33 being formed along the sides of the body portion 22 between the fins 24. The legs 33 extend rearwardly a distance greater than the length of the body portion to simulate a movement of the legs of a "squid". The soft material allows the legs to float freely in the water and to move with the changing currents to create the visual effect of a body moving through the water.

Thus, it should be apparent that there has been provided, in accordance with the invention, a fishing lure that fully satisfies the aims and advantages set forth above. While the invention has been described in conjunction with specific embodiments thereof, it is evident that many alternatives, modifications, and variations will be apparent to those skilled in the art. Accordingly, it is intended to embrace all such alternatives, modifications, and variations as fall withint he spirit and broad scope of the appended claims.

The embodiments of the invention in which an exclusive property or privilege is claimed are defined as follows:

1. An artificial lure for a treble type fish hook, said lure comprising:
    an integral resilient elongate member forming a lure and having a body portion,
    a number of fins formed on said body portion each of said fins being formed by a pair of lips which define a slot for the hooks on the fish hook,
    and a tail portion extending rearwardly from said body portion and being free to move in a manner resembling the motion of a living creature in the water.

2. The lure according to claim 1 wherein said body portion includes a longitudinally extending opening to house the shaft of the treble type fish hook with the eye extending forwardly from the body portion for attachment to a fishing line.

3. The lure according to claim 2 wherein each of said lips of said fins has an outer contour conforming with the curvature of the hooks on the treble type fish hook whereby said fins prevent snagging of the fish hook on weeds in the water.

4. The lure according to claim 2 wherein said tail portion includes three legs, each leg having one end formed integral with said body portion and located between the fins on said body portion, the other end extending rearwardly from said body portion.

5. The lure according to claim 1 wherein each of said fins has an outer contour conforming with the curvature of the hooks on the treble type fish hook whereby said fins prevent snagging of the fish hook on weeds in the water.

6. The lure according to claim 5 wherein said tail portion includes three legs formed between the fins on said body portion and extending rearwardly a distance greater than said body portion.

7. The lure according to claim 1 wherein said tail portion includes three legs formed integral with said body portion and located between the fins on the body portion.

8. An artificial lure for a treble type fish hook having a shank, an eye on one end of the shank, and three hooks on the other end of the shank, said lure comprising:

an integral resilient elongate member having a body including a longitudinally extending opening to house the shank of the treble type fish hook with the eye extending outwardly from the front body portion and the hooks projecting radially outwardly from the rear of the body portion, a fin formed on the outside of said body portion for each of the hooks on the treble type fish hook, each fin including a pair of lips for enclosing the corresponding hook and having a contour conforming to the contour of the hook to protect the hook from snagging in weeds in the water and a tail extending rearwardly from said body portion and including three legs having one end formed on the body portion between the fins and extending rearwardly from the body portion a distance greater than the length of the body portion and being free to move in a manner resembling the motion of a living creature in the water.

* * * * *